United States Patent
Dawes et al.

(10) Patent No.: US 7,145,881 B1
(45) Date of Patent: Dec. 5, 2006

(54) METHOD OF DETERMINING THE ROUTE OF PACKETS THROUGH A NETWORK OF COMMUNICATING OBJECTS

(75) Inventors: Nicholas W. Dawes, Ottawa (CA); David Schenkel, Ottawa (CA)

(73) Assignee: Peregrine Systems, Inc., San Diego, CA (US)

( * ) Notice: Subject to any disclaimer, the term of this patent is extended or adjusted under 35 U.S.C. 154(b) by 937 days.

(21) Appl. No.: 09/678,783

(22) Filed: Oct. 4, 2000

(30) Foreign Application Priority Data

Apr. 10, 2000 (CA) .................................... 2304542

(51) Int. Cl.
*H04L 12/28* (2006.01)

(52) U.S. Cl. ...................... 370/253; 709/224

(58) Field of Classification Search ................ 370/254, 370/255, 256, 257, 258, 252, 253, 400, 401; 709/223, 224; 345/734, 969
See application file for complete search history.

(56) References Cited

U.S. PATENT DOCUMENTS

| | | | | |
|---|---|---|---|---|
| 5,563,875 A | * | 10/1996 | Hefel et al. | 370/249 |
| 5,570,346 A | * | 10/1996 | Shur | 370/231 |
| 5,699,348 A | * | 12/1997 | Baidon et al. | 370/242 |
| 5,793,976 A | * | 8/1998 | Chen et al. | 709/224 |
| 5,878,032 A | * | 3/1999 | Mirek et al. | 370/252 |
| 5,910,803 A | * | 6/1999 | Grau et al. | 345/734 |
| 5,926,463 A | * | 7/1999 | Ahearn et al. | 370/254 |
| 6,003,074 A | * | 12/1999 | Vasconcellos | 709/220 |
| 6,023,733 A | | 2/2000 | Periasamy et al. | |
| 6,046,988 A | | 4/2000 | Schenkel et al. | |
| 6,697,338 B1 | * | 2/2004 | Breitbart et al. | 370/254 |

FOREIGN PATENT DOCUMENTS

EP       0 716 525      6/1996

\* cited by examiner

*Primary Examiner*—Frank Duong
(74) *Attorney, Agent, or Firm*—John A. Merecki; Hoffman, Warnick & D'Alessandro LLC

(57) ABSTRACT

A method of determining a routing for packets in a network, the method comprising a) dividing the network into WAN (Wide Area Network) segments and LAN (Local Area Network) segments; b) determining a routing for packets through each segment; combining routing results obtained in step b) to obtain a total routing through the network.

14 Claims, 3 Drawing Sheets

METHOD OF DETERMINING THE ROUTE OF PACKETS THROUGH A NETWORK OF COMMUNICATING OBJECTS

FIELD OF THE INVENTION

The present invention relates to computer networks and, more specifically, to methods which determine the route of packets through a network.

BACKGROUND TO THE INVENTION

Operators of communications networks often need to know the path that packets take between two points in a network. As an example, if an end user complains that he cannot get through to a particular server, the operator of that network needs to find out where the problem may be. If the problem is with a point on the network, the operator therefore needs to find the route packets from the end user travel toward the server in the network to properly diagnose the problem.

Two scenarios where the routing of packets can be quite useful are in determining the performance of a network and in determining where the bottlenecks of a network may be. In the first scenario, the performance of specific routes can be determined if the routing can be found. In the second scenario, by listing each point in the route bottlenecks in the network can be found. However, while the solution and results can be found for both scenarios using other means, knowledge of the routes greatly simplifies the process.

It should be noted that the term networks includes wide area networks (WANs), local area networks (LANs), and many combinations thereof. For the purposes of this document, WANs are defined as collections of interconnected network routers bounded by LANs. A LAN is defined as a collection of interconnected non-router objects (including nodes, servers, and bridges), each LAN being connected to other LANs by routers.

For any given network, it is most advantageous if the topology of that network is known. Such knowledge would assist in the above routing determination problem. Fortunately, methods, such as those disclosed by Dawes et al in U.S. Pat. No. 5,926,462 and U.S. Pat. No. 5,933,416, exist whereby the topology of a network of objects can be determined the disclosures of which are incorporated by reference.

From the above, there is therefore a need for methods to determine the route that a packet takes through a network. Preferably, such methods would take advantage of available processes such as those referenced above.

SUMMARY OF THE INVENTION

The present invention meets the above need by providing methods which decompose a network into WAN and LAN segments. After the decomposition, the route is determined for each WAN and LAN segment. Often, the WAN path is unambiguously known from the topology of the network. For WAN segments where the path is ambiguous, the sequence of routers in the path from a source to a destination can be determined by the standard "traceroute" method. This allows for the aggregation of multiple path sections to arrive at the full packet path through the WAN segment. For most LAN segments, the path is unambiguously known from the topology. In LAN segments where the path is ambiguous, perhaps because of VLANs (Virtual LANs), every store and forward network element in the LAN segment tracks and can report the source addresses of packets which pass through it. By reading these records and noting which network element received a packet from a specific source address, the route of that packet can be mapped through that LAN segment.

By combining the mapped path through multiple LAN segments with the full packet path through the different WAN segments, the full route a packet traverses through a network can be determined.

Using the invention, not only can the packet routing through a network be found but the performance of specific portions of the network can be found as well. This can simplify the task faced by network operators and, ultimately, can improve the service provided to end users using the network.

In accordance with a first broad aspect of the invention, there is provided a method of determining a routing for packets in a network of network objects, said method comprising:

a) dividing said network into LAN (Local Area Network) segments of non-routing objects, and WAN (Wide Area Network) segments of routing objects;
b) determining connections between non-routing objects, and between routing objects;
c) determining a routing for packets through each segment based on connections determined in step b);
d) combining said routing determined for each segment in step c) to obtain a total routing through the network.

In accordance with a second broad aspect of the invention, there is provided a method of determining a packet's routing through a LAN segment composed of multiple network objects, said method comprising:

a) determining a network address of a source network object;
b) determining a network address of a destination network object;
c) determining which network objects receive packets from the source network object;
d) determining connections between network objects using the topology of the LAN segment; and
e) determining which network objects are in a route from the source network object to the destination network objects based on data obtained in steps c) and d).

In accordance with a third broad aspect of the invention, there is provided a method of determining the performance of a route in a network, the method comprising:

a) determining a source network object;
b) determining a destination network object;
c) determining a route through the network from the source network object to the destination network object;
d) measuring the network performance of each network object on the route; and
e) aggregating the network performances obtained in step d) to obtain a total network performance for the route, wherein said network performance comprises a network element's drop rate of packets and said total network performance comprises the end to end transmission fraction over a path, wherein said end to end transmission fraction over a path is determined according to $$T = \prod_{i=1-N} (1 - D(i))$$

where
T=end to end transmission fraction over a path from object 1–N
D(i)=drop rate of device i.

BRIEF DESCRIPTION OF THE DRAWINGS

A better understanding of the invention may be obtained by reading the detailed description of the invention below, in conjunction with the following drawings, in which.

DETAILED DESCRIPTION OF THE PREFERRED EMBODIMENT

Figure 1:
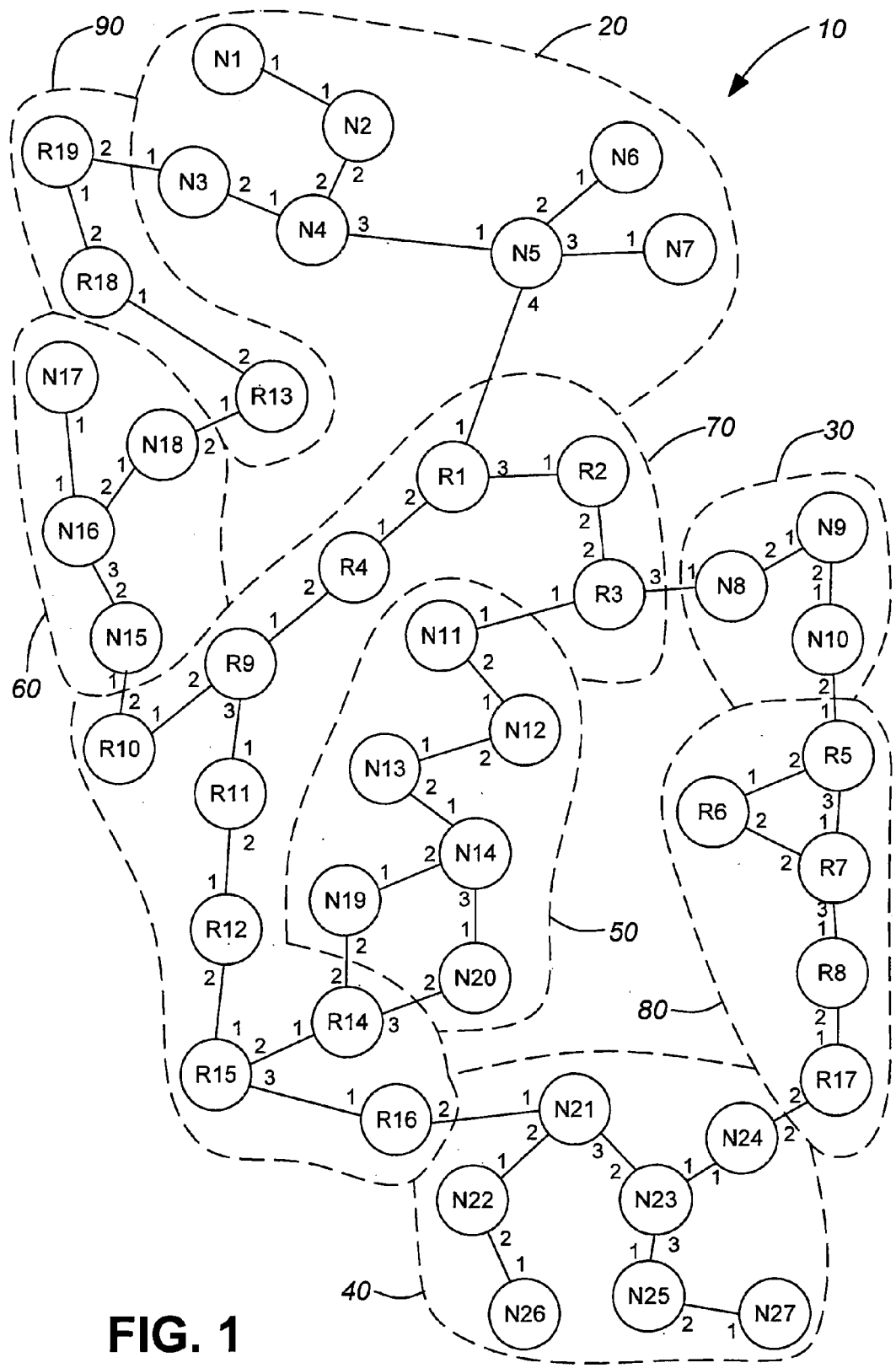
FIG. 1 illustrates a network on which the invention may be applied.

Referring to FIG. 1, a network 10 is illustrated. As can be seen, the network 10 is composed of routers R1–R19 and non-router objects N1–N27. The non-router objects N1–N27 can be switches, hubs, network nodes, or any other device connected to a network.

For clarity, it should be noted that each object, whether it be a router or not, may have multiple ports. FIG. 1 shows the port number for each object next to its link. For example, non-router object N5 has 4 ports: N5(1) (meaning object N5 port 1) connecting to N4(3), N5(2) connecting to N6(1), N5(3) connecting to N7(1), and N5(4) connecting to R1(1). The table (TABLE 1) below lists the connections in FIG. 1 using the notation above.

TABLE 1

| OBJECT | PORT | CONNECTED TO |
|---|---|---|
| N1 | 1 | N2(1) |
| N2 | 1 | N1(1) |
|  | 2 | N4(2) |
| N3 | 1 | R19(2) |
|  | 2 | N4(1) |
| N4 | 1 | N3(2) |
|  | 2 | N2(2) |
|  | 3 | N5(1) |
| N5 | 1 | N4(3) |
|  | 2 | N6(1) |
|  | 3 | N7(1) |
|  | 4 | R1(1) |
| N6 | 1 | N5(2) |
| N7 | 1 | N5(3) |
| N8 | 1 | R3(3) |
|  | 2 | N9(1) |
| N9 | 1 | N8(2) |
|  | 2 | N10(2) |
| N10 | 1 | N9(2) |
|  | 2 | R5(1) |
| N11 | 1 | R3(1) |
|  | 2 | N12(1) |
| N12 | 1 | N11(2) |
|  | 2 | N13(1) |
| N13 | 1 | N12(2) |
|  | 2 | N14(1) |
| N14 | 1 | N13(2) |
|  | 2 | N19(1) |
|  | 3 | N20(1) |
| N15 | 1 | R10(2) |
|  | 2 | N16(3) |
| N16 | 1 | N17(1) |
|  | 2 | N18(1) |
|  | 3 | N15(2) |
| N17 | 1 | N16(1) |
| N18 | 1 | N16(1) |

TABLE 1-continued

| OBJECT | PORT | CONNECTED TO |
|---|---|---|
|  | 2 | R13(1) |
| N19 | 1 | N14(2) |
|  | 2 | R14(2) |
| N20 | 1 | N14(3) |
|  | 2 | R14(3) |
| N21 | 1 | R16(2) |
|  | 2 | N22(1) |
| N22 | 1 | N21(2) |
|  | 2 | N26(1) |
| N23 | 1 | N24(1) |
|  | 2 | N21(3) |
|  | 3 | N25(1) |
| N24 | 1 | N23(1) |
|  | 2 | N17(2) |
| N25 | 1 | N23(3) |
|  | 2 | N27(1) |
| N26 | 1 | N22(2) |
| N27 | 1 | N25(2) |
| R1 | 1 | N5(4) |
|  | 2 | R4(1) |
|  | 3 | R2(1) |
| R2 | 1 | R1(3) |
|  | 2 | R3(2) |
| R3 | 1 | N11(1) |
|  | 2 | R2(2) |
|  | 3 | N8(1) |
| R4 | 1 | R1(2) |
|  | 2 | R9(1) |
| R5 | 1 | N10(2) |
|  | 2 | R6(1) |
|  | 3 | R7(1) |
| R6 | 1 | R5(2) |
|  | 2 | R7(2) |
| R7 | 1 | R5(3) |
|  | 2 | R6(2) |
|  | 3 | R8(1) |
| R8 | 1 | R7(3) |
|  | 2 | R7(1) |
| R9 | 1 | R4(2) |
|  | 2 | R10(1) |
|  | 3 | R11(1) |
| R10 | 1 | R2(1) |
|  | 2 | N15(1) |
| R11 | 1 | R9(3) |
|  | 2 | R12(1) |
| R12 | 1 | R11(2) |
|  | 2 | R15(1) |
| R13 | 1 | N18(2) |
|  | 2 | R18(1) |
| R14 | 1 | R15(2) |
|  | 2 | N19(2) |
|  | 3 | N20(2) |
| R15 | 1 | R12(2) |
|  | 2 | R14(2) |
|  | 3 | R16(1) |
| R16 | 1 | R15(3) |
|  | 2 | N21(1) |
| R17 | 1 | R8(2) |
|  | 2 | N24(2) |
| R18 | 1 | R13(2) |
|  | 2 | R19(2) |
| R19 | 1 | R18(2) |
|  | 2 | N3(1) |

To determine the route a packet takes in travelling from one point in the network 10 to another point in the same network, a number of constraints have to be placed on the route to be found, otherwise the process may become, if not untenable, then impractical.

These are:
a) a path cannot pass through a broken device or interface;
b) a path cannot pass through an interface which, although up, is carrying no traffic;
c) a path cannot loop back on itself.

Furthermore, it should be assumed that the topology or the interconnections between the different elements of the network, is known. This not only greatly simplifies the process but actually allows the process to be carried out. If the topology is not known, the methods described by Dawes et al in U.S. Pat. No. 2,926,462 and U.S. Pat. No. 5,933,416 as noted above can be used to find the topology. For the purpose of this document, the topology of the network 10 is as shown in FIG. 1.

With these constraints in mind, the first step in the process is to decompose the network 10 into router objects and non-router network objects. It should be clear from FIG. 1 and from the above that objects R1–R19 are routers while objects N1–N27 are non-router objects. Based on this, the network 10 can then be divided into WAN segments and LAN segments. Since LAN segments are connected non-router objects bound by router objects, network 10 has five LAN segments 20, 30, 40, 50, 60. Also, since WAN segments are interconnected router objects bounded by LAN segments, network 10 has three WAN segments 70, 80, 90.

Figure 2:
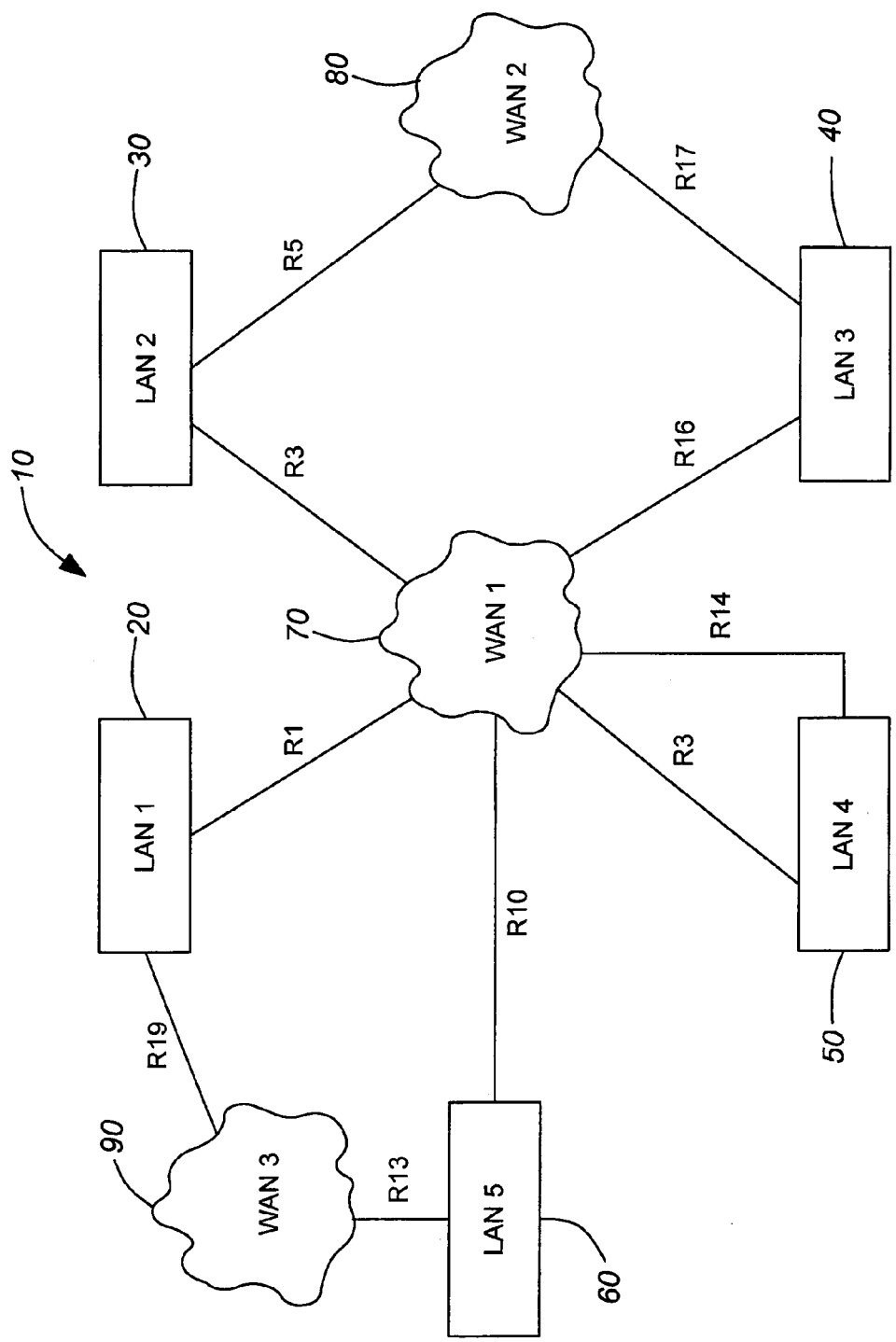
FIG. 2 is an illustration of a network of FIG. 1 decomposed into LAN and WAN segments.

To assist in the understanding of the above, FIG. 2 illustrates the interconnections between the LAN and WAN segments. Reference to FIGS. 1 and 2 should make the discussion clear. LAN segment LAN1 (20) is composed of non-router objects N1, N2, N3, N4, N5, N6 and N7. LAN segment LAN2 (30) is composed of non-router objects N8, N9, and N10. LAN segment LAN3 (40) is composed of non-router objects N21, N22, N23, N24, N25, N26, and N27. LAN segment LAN4 (50) is composed of non-router objects N11, N12, N13, N14, N19 and N20. LAN segment LAN5 (60) is composed of non-router objects N15, N16, N17 and N18.

For the WAN segments, WAN segment WAN1 (70) is composed of router objects R1, R2, R3, R4, R9, R10, R11, R12, R14, R15 and R16. WAN segment WAN2 (80) is composed of router objects R5, R6, R7, R8 and R17. WAN segment WAN3 (90) is composed of router objects R13, R18 and R19.

Also as can be seen from FIG. 2, the router object connecting a LAN segment to a WAN segment is noted next to the link. Thus, as an example, router object R5 connects WAN segment WAN2 (80) to LAN segment LAN2 (30) while router object R17 connects LAN segment LAN3 (40) to WAN segment WAN2 (80).

Assuming non-router object N1 is the source of a packet and router object N27 is the destination, the path must therefore be determined for each LAN or WAN segment the packet traverses. To find the sequence of routers the packet would traverse, non-router object N1 could use the well known and widely available traceroute function. This function, essentially a small utility program run by a node, records the sequence of routers passed through from the computer invoking the utility to a given destination. Thus, if non-router object N1 invokes the traceroute utility, the sequence of routers could be:

R1-R4-R9-R11-R12-R15-R16.

If this was the sequence returned, and based on the known topology of the network 10, it can be seen that only WAN segment WAN1 (70) is traversed. However, if the sequence returned were as follows:

R1-R2-R3-R5-R7-R8-R17 then, again using the knowledge of the topology, the route traverses not only WAN segment WAN1 (70) but also WAN segment WAN2 (80). This is because routers R5, R7, R8 and R17 are in WAN segment WAN2 while the other routers are in WAN segment WAN1. Also, since WAN segment WAN2 is traversed, it is clear that the path through LAN segment LAN2 must also be determined in addition to the routing through LAN segments LAN1 (the source LAN segment) and LAN3 (the destination LAN=segment).

If, for the purposes of this example, the traceroute utility returned the first sequence of the routers, the sequence which only traverses WAN segment WAN1, we therefore know the route through the WAN segment. To determine the route through LAN segments LAN1 (20) and LAN3 (40), each non-router element in those LAN segments would have to be queried. Each non-router network object, whether it is a switch or hub, keeps a record (in a table) of the source MAC (Media Access Control) address of the packets which transit through it. Thus, by examining these tables, it can be determined which network object receives packets from which source network object.

As an example, the table below (Table 2) shows some of the non-router objects of LAN segment LAN1 (20) and the source MAC addresses of packets these objects have received.

TABLE 2

| LAN1 Object and Port | Source MAC Address and Packets |
|---|---|
| N1(1) | N2, N3, N5, N6, N7, N4 R1, R19 |
| N2(1) | N1 |
| N2(2) | N4, N5, N7, R1, R19 |
| N3(1) | R19 |
| N3(2) | N1, N2, R1, N4, N5 |
| N4(1) | N3, R19 |
| N4(2) | N1, N2 |
| N4(3) | R1, N5, N6, N7 |
| N5(1) | R19, N3, N4, N1, N2 |
| N5(2) | N6 |
| N5(3) | N7 |
| N5(4) | R1 |

From the table above, non-router object N1 can be "seen" by non-router objects N2, N3, N4, N5, N6, and N7. This is because each of these objects can receive packets originating from N1. (E.g. N2 can receive it through N2(1), N3 can receive it from N3(2), etc). The objects traversed by a packet from N1 (source) to R1 (interim destination) are the objects which can receive packets from N1, N3, N6 and N7 while capable of receiving packets from N1, is, from the topology of the LAN segment, clearly not on the route from N1 to R1. Since it is known that N2 is the only link to N1, then N2 must be on the path. Also, since it is known that N4 is the only link to N2, then N4 must be on the path as well.

Because N3 is not connected to R1 and since there is no link from N3 to N5 without going through N4, then N3 is not on the path from N1 to R1. We can see that N5 is the only link to R1–N5 must therefore be on the path from N1 to R1.

Thus, from the topology and Table 2, a packet must travel from N1 to R1 (since R1 is the first router encountered travelling from N1 to N27 as determined from the sequence of routers using traceroute above) via the following objects and ports:

N1(1)->N2(1)->N2(2)->N4(2)->N4(3)->N5(1)->N5(4)->R1(1).

The analysis therefore looks for a route from within the LAN segment going to a destination (albeit interim) that is external to the LAN segment.

Once the packet has entered router R1, it has effectively left LAN1 and is in WAN1.

At this point, it is already known what sequence of routers that packets traverses through WAN1. What is therefore needed is the path from WAN1 to LAN segment LAN3 (40) and the path within LAN3. Again, each object in LAN3 would have to be queried for its MAC source address table entries. If we take these as follows:

TABLE 3

| LAN3 Object and Port | Source MAC Address |
|---|---|
| N21(1) | R16 |
| N21(2) | N22, N26 |
| N21(3) | N23, N24, N25, R17, N27 |
| N22(1) | N21, R16 |
| N22(2) | N26, N27 |
| N23(1) | N24, R17 |
| N23(2) | N21, R16 |
| N23(3) | N25, N27 |
| N24(1) | N23, N25, N21, R16, N27, N22, N26 |
| N24(2) | R17 |
| N25(1) | N23, N21, R16, N24, R17 |
| N25(2) | N27 |
| N26(1) | N22, N21, R16 |
| N27(1) | N16, N21, N23, N25, R17, N24, N22, N26 |

For this LAN segment, the analysis is the converse of that for LAN1. While in LAN1 the route was from within the LAN segment to a point external to the LAN segment, for the destination LAN segment to a point within the LAN segment. Thus, router R16 must be treated as the source MAC address and objects which can "see" R16 are of interest. From TABLE 3, these objects are N21, N22, N23, N24, N25, N26, and N27. Since N21 is the only route to the router, N21 must be on the path. From the topology, N25 is the only link to N27 so N25 must be on the route to N27. Since N23 connects (again from the topology) N21 and N25 (both of which are on the route) then N23 must be on the route as well. Thus, the sequence of non-router objects traversed when travelling from R16 to N27 is as follows:

R16(2)->N21(1)->N21(3)->N23(2)->N25(1)->N25(2)->N27(1).

Since we now have the route through LAN1, WAN1, and LAN3, these paths can be put together to arrive at the full path from N1 to N27:

LAN1: N1->N2->N4->N5 WAN1

WAN1: R1->R4->R9->R11->R12->R15->R16→LAN3

LAN3: N21->N23->N25->N27

It should be noted that, once a packet leaves a WAN segment and enters a LAN segment, that packet's source MAC address becomes the exit port of the last router it went through. Thus, a packet from N1 to N10 will have a source MAC address of N1 as it travels through LAN1. However, once that packet enters LAN2, its source MAC address becomes R3, this being the last router that it exited.

It should be also be noted that path ambiguities, especially in LAN segments, can sometimes be resolved by logic. For example, if a packet is leaving object N12 (source) to arrive at router R14 but none of the ports of object N14 report seeing packets from object N12, it should be clear that object N14 is on the path. This is because N14 must be on the path to pass the packet through to either N19 or N20 and subsequently to R14.

Determination of the path through LAN segments therefore requires repeated readings of the source address capture information from devices/objects in that LAN segment. This can be accomplished using the Simple Network Management Protocol (SMNP).

While the above example found the path from N1 to N27, the return path, with N27 as the source and N1 as the destination, may not be the same. Such a path may traverse the network from LAN3 to WAN2 to WAN1 and finally to LAN1. Determining this path would involve finding the path through the different LAN segments (LAN3, LAN2, and LAN1) and the different WAN segments (WAN2 and WAN1).

While the method outlined above can determine the path from a specific source to a specific destination, it would be difficult to determine the path from an arbitrary source to an arbitrary destination, especially if a control computer were not the source. If, again with reference to FIG. 1, N1 was the control computer and the path from N17 to N24 were required, it would be quite difficult for N1 to find this path.

However, if specific objects were designated as beacon objects, these beacon objects could find the data required and report such data back to the control computer. A beacon object is essentially a network object, usually a non-router object, which traces paths through the network and reports these paths to the control computer. Designating and using a beacon object can be as simple as having the control computer send instructions to a network object A to perform a traceroute from itself, object A, to another network object B. The network object A will then perform this duty and, once the results of the traceroute function have been received, sends this result to the control computer. As an example, if N16 were designated as a beacon object, it could determine a path from itself (Nl6) to the destination (N24). Since N17 is only one link away from the beacon, the path from N17 would simply be the path from the beacon (Nl6) to the destination (N24) plus the hop from N17. Similarly, if one wished to find the route from R5 to R17 (the path being ambiguous at R5), N10 could be designated as a beacon. By executing the traceroute function from N10 to R17, this ambiguity may be resolved. This is because a packet travelling from N10 to R17 must transit through R5 and either R6 or R7.

For optimal placement of beacon objects, the topology of the network and the location of the source or destination objects must be taken into account. If a LAN segment interconnected two segments through which the path passed, a beacon placed in that interconnecting LAN segment would be very advantageous. Thus, from FIG. 2, if the source was in LAN4 (such as N19) and the destination was in LAN3 (such as N25) with R16 not carrying any traffic or is down, the only route would be LAN4->WAN1->LAN2->WAN2->LAN3. A beacon placed in LAN2 could prove very helpful in finding this path. Alternatively, if a LAN segment contained at least one source or destination, a beacon in that LAN segment would also prove advantageous. For example, if the source was N13 and the destination was N2 with router R1 down or inoperative, beacons could be placed at N14, N16, and N4. N14 would prove advantageous as it is in the same LAN segment as the source. N16 is in a LAN segment connecting two WAN segments (WAN1 and WAN3), while N4 is in the same LAN segment as the destination.

Once the routing from a source to a destination has been determined, the performance of that route can be measured. Because the specific objects traversed in travelling from a source to a destination is known, the overall performance of that route is merely a function of the individual performance of each of these objects.

More specifically, using known methods, such as discussed in Canadian Patent No. 2,196,133, whereby a method of analyzing a communication network comprising determining a mean drop rate in a device x by polling each device from a network management computer (NMC) which is in communication with the network, and processing signals in the NMC to determine a drop rate D(x), in accordance with: D(x)=((L+(x)−L−(x))/2, and L(x)=1−A(x) where A(x): the fraction of poll requests from the NMC to device x for which the NMC receives replies (measured over the last M sampling periods), (wherein x must not be broken), D(x): the mean frame drop rate in device x, L(c): NMC's perception of the loss rate to device x and back, L−(x): the NMC's perception of the mean value of L(z) for all devices z connected to device x, closer to the NMC than device x and which are not broken, and L+(x): the NMC's perception of the mean value of L(z) for all devices z connected to device x, further away from the NMC than device x and which are not broken is disclosed, the end to end performance of a path can be easily found. One possible performance measure for a path is the end to end transmission fraction over a specific path. This measures what fraction of packets are actually transmitted from a source to a destination. If we define D(i) as the drop rate on a device (if D(A)=0.12, this means 12% of packets are lost while transmitting through device A) and T as the end to end transmission fraction over a path from the object 1−N, then $$T = \prod_{i=1-N} (1 - D(i))$$

Another performance measurement which may be used is that of end to end delay. By determining the delay through each network element, through known methods, and aggregating such delay measurements for a specific path, the end to end delay for that path can be found.

A further performance measurement is that of end to end availability. By finding the break state or availability of each network element, again from known methods, and then applying the above method for finding a specific path to these, the end to end availability of the path can be found.

From the above end to end performance measurements and from the performance measurements of the individual network element, bottlenecks within the network can be found. If one knows the end to end performance of a path and the performance of the individual network elements, bottlenecks can be pinpointed—whichever network element has the highest performance measurement or the most throughput is most likely the bottleneck.

These and other performance measurements can therefore be found more easily using the path determining method above.

Figure 3:
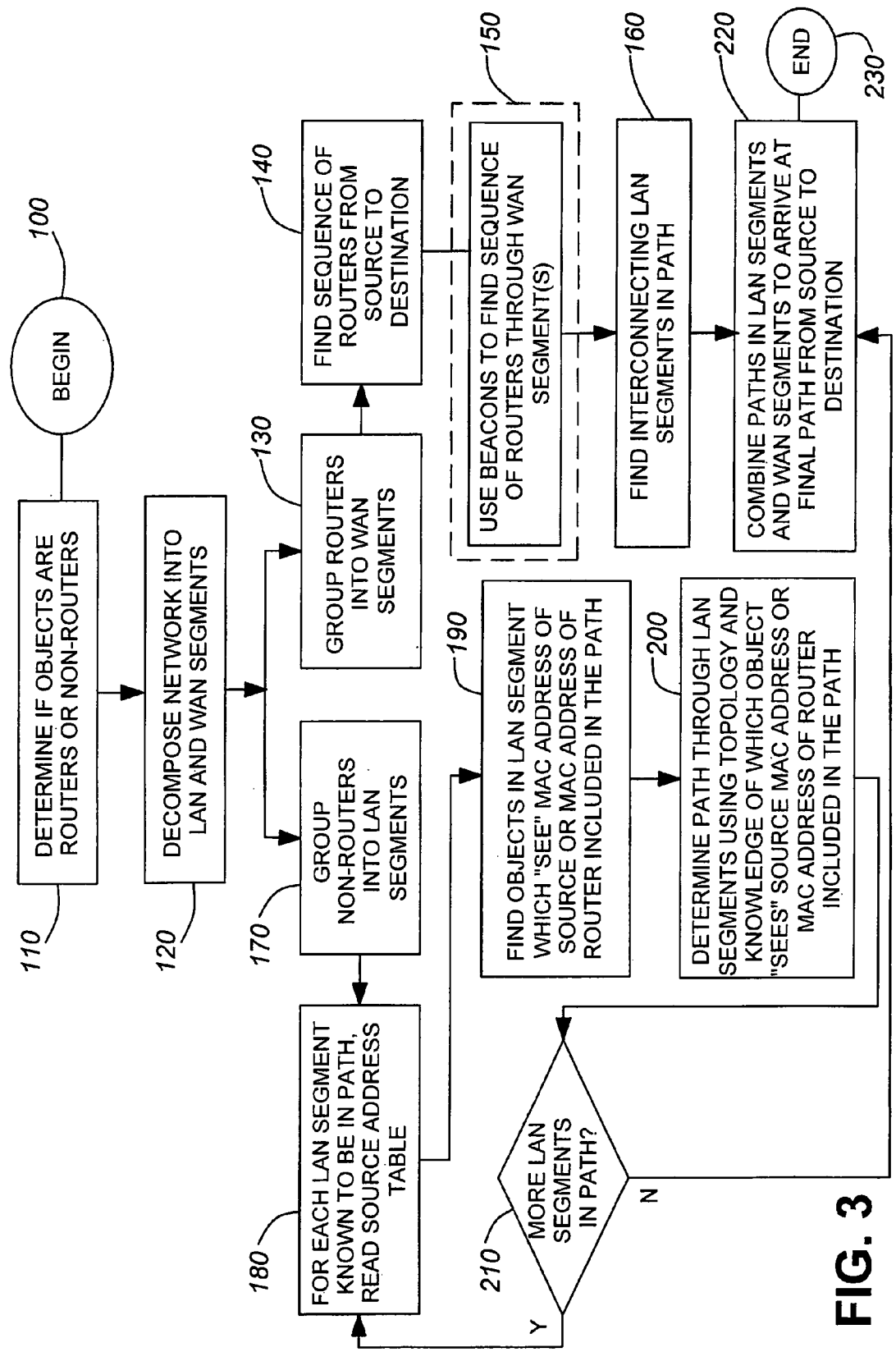
FIG. 3 is a flow chart detailing the different steps in a method of the invention.

To clarify the method outlined above, FIG. 3 illustrates a flowchart detailing the steps executed.

Beginning at the BEGIN box 100, box 110 notes that the objects in the network must be determined if they are router objects or non-router objects. In box 120, the network is decomposed in LAN and WAN segments. Box 130 notes that all routers must be grouped into WAN segments. Each WAN segment must be bounded by or regenerated from other WAN segments by at least one non-router object. Once the WAN segments have been grouped, box 140 notes that the sequence of routers from the source to the destination must be found. As noted above, the well known traceroute function can be used for this. Well placed beacon objects in the network can be used for the traceroute step if required. The step in box 150 is optional as evidenced by the dashed box around it. Step 150 would be most useful if the path traversed multiple WAN segments, such as if the path led through WAN1 and WAN2 in FIGS. 1 and 2. If, however, the path only led through a single WAN segment, beacons may not be required.

Once the path is determined through the WAN segments, any intervening LAN segments interconnecting the WAN segments must be resolved. (E.g. if the path led through WAN1, WAN 2, and LAN2 in FIG. 2, the path through LAN2 would have to be found). (See box 160).

It should be noted that the step in box 170, that of grouping the non-router segments into LAN segments, can be executed concurrently with the step in box 130. However, in the beginning of the process, the only known LAN segments are the LAN segments of the source and the destination. Thus, the two LAN segments would be the first ones grouped. Any interconnecting LAN segments between WAN segments can be grouped subsequently.

The next step is that shown in box 180—that of reading the source address tables for the objects in the subject LAN segment. This is done to find out which object in that LAN segment receives or "sees" the relevant source MAC address. For the LAN segment to which the source object belongs, the relevant MAC address would be the MAC address of the source object. For any other LAN segment, the relevant source MAC address would be the MAC address of the router from which the packet entered the LAN segment. As an example, from FIG. 1, if the router sequence was R14-R15-R16 and then N21, the relevant source MAC address for the LAN segment LAN3 would be the MAC address of router R16 and, more specifically, the MAC address of port 2 of router R16.

Once the source MAC address tables have been read, box 190 notes that path through the LAN segment must be found.

By knowing which objects "see" the relevant MAC and which objects are interconnected, the path from one point in a LAN segment to another in the same LAN segment can generally be determined. (See box 200). In case of ambiguities, logic can be used to find a reasonable path. If the ambiguity cannot be resolved, user intervention may be required.

Decision 210 determines if there are more LAN segments to be analysed. These LAN segments may have resulted from the step in box 160. If there are more LAN segments, these are immediately analysed in the loop formed by boxes 180, 190, 200, 210.

If there are no more LAN segments to be examined, this means that the path has been found. The final step (box 220) is to combine the paths found in the individual WAN and LAN segments into a coherent whole. By combining multiple segments, the path through any combination of LAN and WAN segments can be found.

The invention described above is ideally implemented with the use of a single control computer which instructs multiple beacons in the network. By using this scheme, each beacon can act as the source to determine the path to and from arbitrary points in the network. The beacons then report their findings to the control computer. From FIG. 1, if the control computer was object N17 and the beacons were objects N2, N9, N13, and N21, most paths can be found. If the path from N4 to N8 were desired, N2 can act as the source. By simply removing the hop from N4 to N2, the path found is the path from N4 to N2. Similarly, if the path from N20 to N15 were desired (and assuming that a direct path existed between N13 and N14), then N13 can act as the source. The hops from N20 to N13 can be removed from the resulting path to find the desired path from N20 to N15.

A person understanding the above-described invention may now conceive of alternative designs, using the principles described herein. All such designs which fall within the scope of the claims appended hereto are considered to be part of the present invention.

We claim:

1. A method of determining a routing for packets in a network of network objects, said method comprising:
   a) dividing said network into LAN (Local Area Network) segments of non-routing objects, and WAN (Wide Area Network) segments of routing objects;
   b) determining connections between non-routing objects, and between routing objects;
   c) determining a routing for packets through each segment based on connections determined in step b);
   d) combining said routing determined for each segment in step c) to obtain a total routing through the network.

2. A method as in claim 1, further including steps:
   a) measuring a network performance of each segment on said routing; and
   b) aggregating said network performances obtained in step a) to obtain a total network performance for said total routing.

3. A method as in claim 1 further including partitioning non-router network objects into discrete LAN segments, each LAN segment being a collection of connected non-router network objects separated from other non-router network objects by at least one router.

4. A method as in claim 1 including partitioning routers into WAN segments, each WAN segment being a collection of connected routers separated from other routers by at least one non-router network object.

5. A method as in claim 4 wherein step c) includes determining for each WAN segment a sequence of routers a packet passes through from a source router to a destination router in the WAN segment.

6. A method as in claim 3 wherein step c) includes determining for each segment which non-router network objects a packet passes through from a source non-router network object to a destination non-router network object in the LAN segment.

7. A method as in claim 1 wherein step c) is executed from a plurality of beacons located at different points in the network.

8. A method as in claim 6 wherein step c) includes reading a table of source addresses at each non-router network object in each LAN segment, said table containing source addresses of packets which transit through said non-router network object.

9. A method as in claim 3 wherein step c) is accomplished using a previously determined topology of the network.

10. A method as in claim 5 wherein the sequence of routers a packet passes through is determined from a plurality of beacons located at different points in the WAN segment.

11. A method of determining a packet's routing through a LAN segment composed of multiple network objects, said method comprising:
   a) determining a network address of a source network object;
   b) determining a network address of a destination network object;
   c) determining which network objects receive packets from the source network object;
   d) determining connections between network objects using the topology of the LAN segment; and
   e) determining which network objects are in a route from the source network object to the destination network objects based on data obtained in steps c) and d).

12. A method of determining the performance of a route in a network, the method comprising:
   a) determining a source network object;
   b) determining a destination network object;
   c) determining a route through the network from the source network object to the destination network object;
   d) measuring the network performance of each network object on the route; and
   e) aggregating the network performances obtained in step d) to obtain a total network performance for the route,
   wherein said network performance is that of a network element's drop rate of packets and said total network performance is the end to end transmission fraction over a path,
   wherein said end to end transmission fraction over a path is determined according to $$T = \prod_{i=1-N} (1 - D(i))$$

where
   T=end to end transmission fraction over a path from object 1–N
   D(i)=drop rate of device i.

13. A method as in claim 12 wherein said network performance comprises a packet's delay through said network element and said total network performance for the route comprises the total end to end delay for a packet traversing said route.

14. A method as in claim 12 wherein said network performance comprises a network element's throughput and said total network performance comprises a determination of bottlenecks in said path.

* * * * *